(12) United States Patent
Meacham

(10) Patent No.: US 9,719,248 B1
(45) Date of Patent: Aug. 1, 2017

(54) METHOD OF SEALING AN EXPANSION JOINT

(71) Applicant: Polyset Company, Inc., Mechanicville, NY (US)

(72) Inventor: Thomas Meacham, Ravena, NY (US)

(73) Assignee: Polyset Company, Inc., Mechanicville, NY (US)

( * ) Notice: Subject to any disclaimer, the term of this patent is extended or adjusted under 35 U.S.C. 154(b) by 0 days.

(21) Appl. No.: 15/082,287

(22) Filed: Mar. 28, 2016

(51) Int. Cl.
- *E04B 1/68* (2006.01)
- *F16J 15/02* (2006.01)
- *E01D 19/06* (2006.01)

(52) U.S. Cl.
CPC ............ *E04B 1/6812* (2013.01); *E01D 19/06* (2013.01); *F16J 15/022* (2013.01)

(58) Field of Classification Search
CPC ........ E04B 1/6812; F16J 15/022; E01D 19/06
USPC .................................... 52/393, 396.04–396.1
See application file for complete search history.

(56) References Cited

U.S. PATENT DOCUMENTS

| | | | | |
|---|---|---|---|---|
| 3,368,464 A | * | 2/1968 | Thorp, Jr. ............. | E01C 11/106 404/49 |
| 3,523,493 A | * | 8/1970 | Berry ...................... | C08L 17/00 404/47 |
| 3,722,379 A | * | 3/1973 | Koester ................. | E01C 11/126 404/68 |
| 3,824,025 A | * | 7/1974 | Beutler ................... | E01C 11/12 404/48 |
| 4,111,584 A | * | 9/1978 | Fyfe ........................ | E01D 19/06 404/69 |
| 4,127,350 A | * | 11/1978 | Weber ..................... | E01D 19/06 404/65 |
| 4,290,249 A | * | 9/1981 | Mass ....................... | E01D 19/06 404/65 |
| 4,615,161 A | * | 10/1986 | Mileham ............... | E01C 11/126 404/69 |
| 4,699,540 A | * | 10/1987 | Gibbon ................... | E01D 19/06 404/49 |
| 4,927,291 A | * | 5/1990 | Belangie ................. | E01C 11/10 404/64 |
| 5,129,754 A | * | 7/1992 | Brower ................. | E04B 1/6813 404/65 |
| 5,141,358 A | * | 8/1992 | Burke ................... | E01D 19/086 404/49 |
| 5,190,395 A | * | 3/1993 | Cathey .................... | E01D 19/06 404/48 |
| 5,197,250 A | * | 3/1993 | Kramer ................... | E01D 19/06 404/65 |
| 5,282,693 A | * | 2/1994 | Daily, Jr. ................ | E01D 19/06 404/47 |
| 8,132,380 B2 | * | 3/2012 | Wilkes, Jr. ............ | E04B 1/6812 52/393 |

* cited by examiner

*Primary Examiner* — Brian Glessner
*Assistant Examiner* — Adam Barlow
(74) *Attorney, Agent, or Firm* — Heslin, Rothenberg, Farley & Mesiti, P.C.

(57) ABSTRACT

A method of sealing a gap between construction slabs by deforming and inserting a sealing member of closed cell foam is described. An assembly including a deformed sealing member and construction slabs is disclosed. Also described is a joint seal configured to seal a gap between constructions slabs, which utilizes a deformed sealing member of closed cell foam installed within the gap.

22 Claims, 5 Drawing Sheets

METHOD OF SEALING AN EXPANSION JOINT

BACKGROUND OF THE INVENTION

Technical Field

The present disclosure generally relates to methods of sealing a gap between construction slabs utilizing deformed closed cell foam. The present disclosure also generally relates to an assembly and a joint seal utilizing such methods.

Background Information

Joints are often incorporated into bridges, parking structures, airport runways, and roadways to fill gaps between adjacent structural slab sections. The joints allow for movement of the sections, such as from vibrations and stress from vehicle traffic and contraction and expansion due to temperature changes. The edges of the slabs at these joints frequently suffer from wear due to traffic, roadway chemicals, weather, and other outside forces. These forces can cause potholes, cracks, and other imperfections that may be hazardous and may result in further damage to the structure in which the sections are incorporated.

When the gaps between adjacent structural slab sections are expanded (for instance, due to a change in temperature), water, dirt, sand, gravel, chlorides, and other debris may become lodged in them. This material may cause problems by preventing adequate movement when the temperature changes, or may damage the underlying structures in the joint, pavement, and/or bridge. These issues also may decrease the smoothness of the upper surface formed at least in part by the structural slab sections, which may result in damage to vehicles traveling thereon, for example. Moisture may also enter the gap and freeze during cold weather, causing cracks or other structural damage to the adjacent pavement slabs. Waterproof joint seals may be required in waste water treatment plants, stadiums, tunnels, potable water applications, and many other interior or exterior commercial structures, as well as in seismic and sound barrier joints.

Attempts to prevent these problems have been made by trying to seal the joint gap. The material used to seal bridge and roadway joints, for example, must be sturdy enough to hold up to outside forces, yet flexible enough to accommodate the necessary contraction, expansion, and other movement of the bridge or roadway. The material must also be watertight, to protect the joint and the underlying substructure.

Current methods for installing these joint seals within a gap between concrete slabs are time consuming and require many steps. They typically entail placing a temporary form into the gap prior to applying nosings (headers) of elastomeric concrete to each concrete slab. Once the elastomeric concrete is cured, the temporary form must be removed from the gap by, for instance, sawing it, and removing the pieces. After the temporary form is removed, a seal is inserted to cover the joint opening by applying adhesive to the nosing or the sides of the concrete slabs and attaching one side of the seal to each of the concrete slabs. While labor-intensive, the temporary form must be removed, as it is not flexible nor waterproof; the form would be destroyed and would damage the integrity of the joint seal if it were left in.

Thus, a need exists for joint seals that meet the requirements necessary for structures and roads; provides a smooth transition between adjacent structural slab sections; is user-friendly; and reduces the cost, labor, and time required for installation.

SUMMARY OF THE INVENTION

The present invention provides, in a first aspect, a method for sealing a gap formed below upper surfaces and between adjacent side surfaces of at least two construction slabs. The method includes: deforming a sealing member comprising closed cell foam from a first state to a second state, the sealing member comprising two wall portions and a convex portion extending there between in the second state; and inserting the sealing member in the second state into said gap such that the two wall portions are disposed against the adjacent side surfaces of the at least two construction slabs, and a peak or "tallest" portion of outer surface of the convex portion of the sealing member is level with or below the upper surfaces of the at least two construction slabs. In some embodiments, a fluid nosing material is introduced into a blocked-out area of at least one of the construction slabs after inserting the sealing member to form a nosing.

The present invention provides, in a second aspect, an assembly. The assembly includes:

a) at least two construction slabs, forming a gap below upper surfaces and between adjacent side surfaces of at least two construction slabs; and b) a sealing member comprising closed cell foam, the sealing member being in a deformed state and including two wall portions and a convex portion extending therebetween, wherein a peak of the convex portion of the sealing member is level with or below the upper surfaces of the at least two construction slabs and the two wall portions of the sealing member are disposed and exert a force against the adjacent side surfaces of the at least two construction slabs.

The present invention provides, in a third aspect, a joint seal configured to seal a gap extending below upper surfaces and between adjacent side surfaces of at least two construction slabs. The joint seal includes a sealing member deformable between a first state and a second state configured to seal the gap, the sealing member comprising two wall portions and a convex portion extending therebetween in the second state, wherein a peak of the convex portion of the sealing member being positioned level with or below the upper surfaces of the at least two construction slabs and the wall portions being disposed and exerting a force against the adjacent side surfaces of the at least two construction slabs in the second state. The sealing member comprises closed cell foam.

These, and other objects, features and advantages of this invention will become apparent from the following detailed description of the various aspects of the invention taken in conjunction with the accompanying drawings. Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
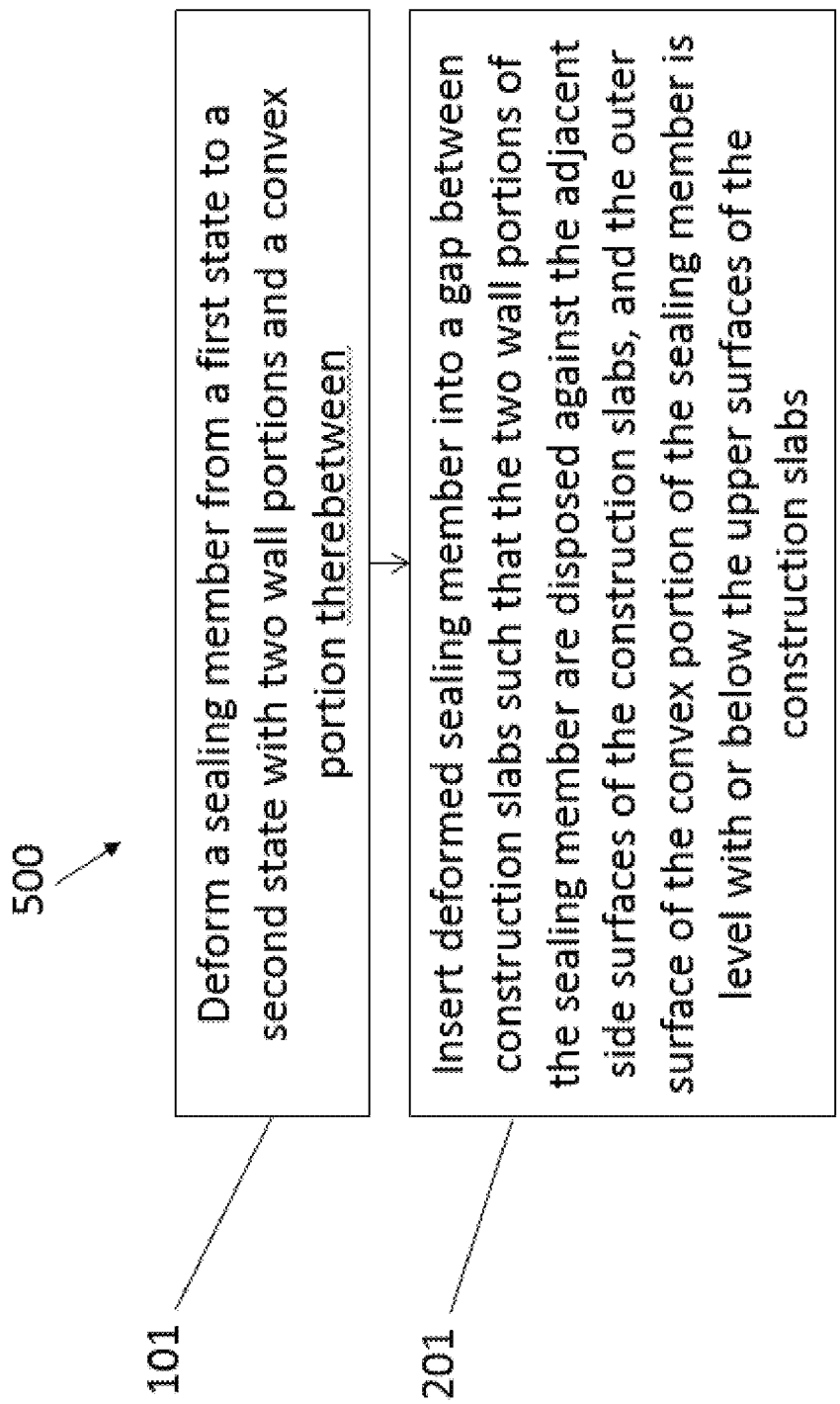
FIG. 1 illustrates one embodiment of a process for sealing a gap between structural slabs, in accordance with one or more aspects of the present disclosure.

Aspects of the present invention and certain features, advantages, and details thereof, are explained more fully below with reference to the non-limiting embodiments illustrated in the accompanying drawings. Descriptions of well-known materials, fabrication tools, processing techniques, etc., are omitted so as to not unnecessarily obscure the invention in detail. It should be understood, however, that the detailed description and the specific examples, while indicating embodiments of the invention, are given by way of illustration only, and are not by way of limitation. Various substitutions, modifications, additions and/or arrangements within the spirit and/or scope of the underlying inventive concepts will be apparent to those skilled in the art from this disclosure.

Reference is made below to the drawings, which are not drawn to scale for ease of understanding, wherein the same reference numbers used throughout different figures designate the same or similar components. Various terms of position used herein, such as "upper", "lower", "outer", "inner", "top", "bottom", "right", "left", "above", "below", "vertical", "horizontal" and similar terms, refer to the elements in the figures, but are used merely for convenience in description and/or reference. These terms are not to imply a necessary positioning of the structure or portions thereof, nor to limit the scope of the invention.

Roadways or other structures are often formed by placing structural or construction slabs or slab sections adjacent to each other, separated by a gap, or cavity. The transitional area between the slabs, that is, the joint, should be sealed while still allowing for movement of the adjacent slabs. Generally stated, disclosed herein is a method of sealing a joint or gap between adjacent slabs in structures and/or roadways. Disclosed herein also are also joint systems and joint seals that utilize a deformable closed cell polyethylene foam material with a convex portion.

The joints, joint systems and related methods described herein may be used for roadways, bridges, parking structures, platforms (such as train platforms), airport runways, warehouses, or any other instance in which adjacent construction or structural slabs form a moving or non-moving gap between them. Therefore, it is to be understood that a description herein of the use of the joints, joint systems and related methods in one situation (e.g., roadways) may equally be applicable to any other application.

A construction or structural slab or slab section may be any configuration or mechanism that provides support of another object. In one embodiment, for example, construction or structural slabs may be utilized to form a road surface, such as a roadway and/or bridge. Construction or structural slabs are commonly made of concrete, but may be formed of any other material. Other suitable materials may include, but are not limited to, asphalt, wood, steel, aluminum, or elastomeric concrete. Combinations of these materials also may be used. Any material that provides a desired level of structural support for a particular application and allows for insertion and retention of a deformable closed cell foam polyethylene material within joints formed thereby may be used.

Current methods of sealing a joint gap between adjacent construction or structural slabs, such as between concrete slabs forming a roadway or bridge, require a number of time-intensive steps. A section of each concrete slab must be cut out to make a space for the insertion of a nosing, or header; the section is typically taken from adjacent corners of the concrete slabs, and is illustrated more fully below. The cut sections and the side walls of the slabs must then be prepared to make them smooth, and a temporary preform is inserted into the joint. This temporary preform is often a Styrofoam board or other like material. Once the preform is inserted and the surfaces are prepared, the nosing may be formed by adding the desired nosing material, for instance, elastomeric concrete. After the nosing material has cured, the temporary preform must be removed to prevent subsequent damage to the joint. This is generally done by cutting the material loose and removing it; however, this method is time consuming and often leaves pieces and residue of the preform within the joint or on the exposed surfaces. Once the preform is removed, a foam backer rod, preformed foam blocks, or a rubber, silicone, or neoprene seal is typically inserted and adhered to the nosings or to the sides of the concrete slabs to cover the joint opening. Finally, a sealant may be applied to the top surface of the seal and nosings, depending on the system being used.

The joint sealing methods of the present disclosure require fewer process steps compared the current method described above, as no temporary form is needed. Eliminating the temporary form saves time by omitting a number of the steps described above and results in a cleaner joint. A process overview of one embodiment of a joint sealing method or process 500 according the present disclosure is illustrated in FIG. 1.

As shown in FIG. 1, a joint sealing process 500 for sealing a gap between at least two construction slabs may include deforming and/or compressing a joint sealing member from a first state to a second state 101. The joint sealing member and its first and second states are described in more detail herein. The deformed sealing member in the second state may include or form a convex portion between two wall portions thereof, as shown in more detail in FIG. 2. The joint sealing process 500 may further include inserting the deformed sealing member into the gap formed between the at least two constructions slabs 201, as shown in FIG. 1. Each construction slab may include or form an upper surface (for instance, that forms a road surface) and a side surface, and the gap may be formed between two adjacent side surfaces of the slabs. The deformed sealing member may be inserted into the gap such that at least a portion of an outer surface of the two wall portions of the sealing member is disposed against a corresponding side surface of the adjacent constructions slabs, as shown in more detail in FIG. 3. The peak of the outer surface of the convex portion of the sealing member may be positioned below or level with the upper surfaces of the adjacent construction slabs. The joint sealing process 500 may thereby seal the joint formed between at least two adjacent construction members.

Figure 2:
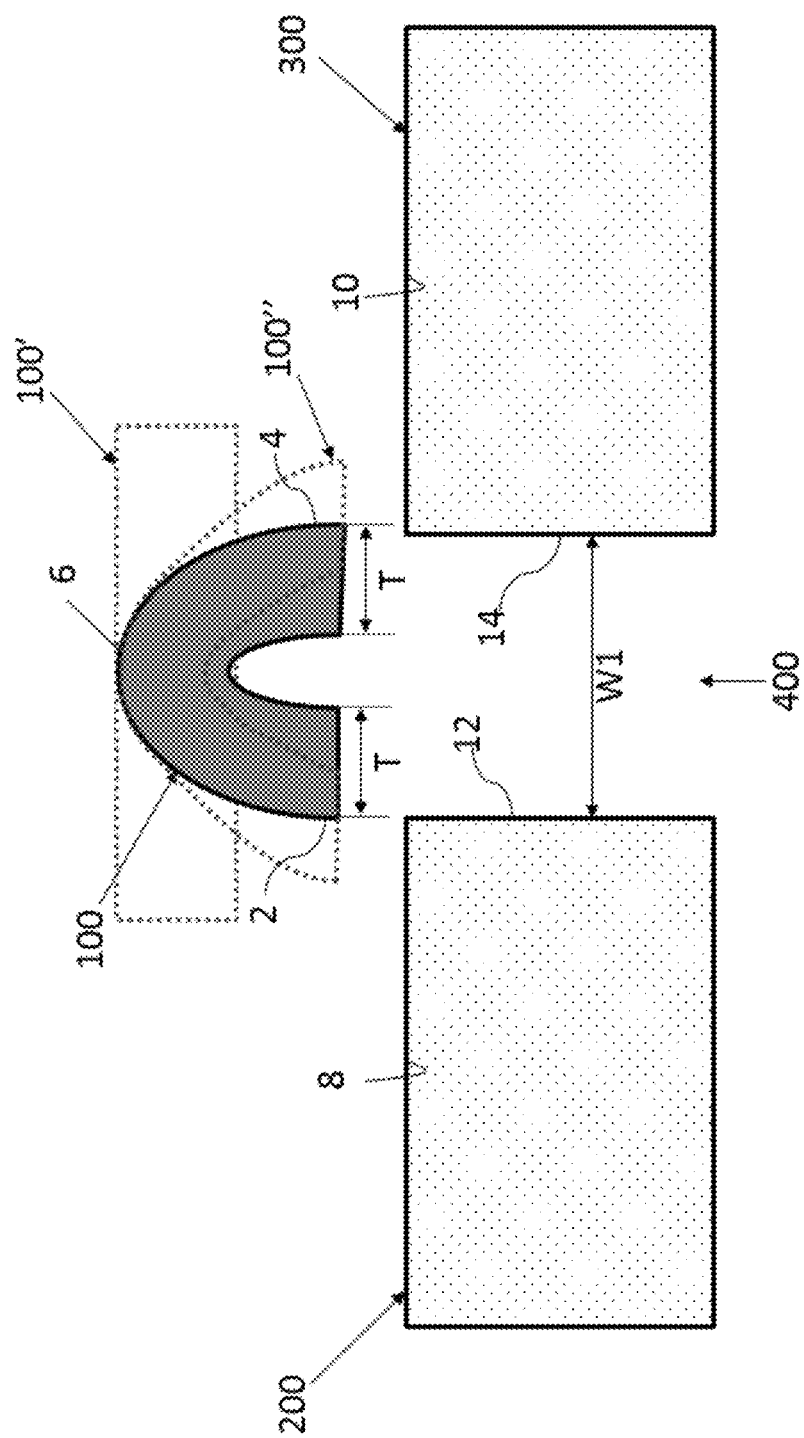
FIG. 2 depicts one embodiment of a joint seal prior to its installation between adjacent structural slabs, in accordance with one or more aspects of the present disclosure.

In FIG. 2, one embodiment of a joint between construction slabs according to the present disclosure is illustrated.

As described above, construction slabs may be any slabs, and may represent or form a portion of roadway, a bridge, or other structure, for example. FIG. 2 depicts two exemplary construction slabs 200, 300 that are adjacent each other and are spaced such that there is at least one gap 400 between them. It is noted that more than two slabs are typically utilized, and in such scenarios many gaps may be formed therebetween. However, when more than two slabs are utilized, the gaps therebetween may typically be substantially aligned and may be sealed with one or more seals. As such, while only two exemplary construction slabs 200, 300 are illustrated, the at least one gap 400 may be a plurality of substantially aligned gaps formed by three or more construction slabs.

As also discussed above, construction slabs 200, 300 can be made of any material, such as a material typically used for a particular construction purpose, including, but not limited to steel (or other metal), asphalt, polymer concrete, wood, and/or concrete. For instance, the slabs 200, 300 may be made of concrete, and the side surfaces 12, 14 may contain asphalt. In some embodiments, the construction slabs 200, 300 may be substantially concrete, steel, asphalt, polymer concrete, and/or wood. In other embodiments, the construction slabs 200, 300 may be substantially concrete. As shown in FIG. 2, the construction slabs 200, 300 may include or form a respective side surface 12, 14, that may cooperate to at least partially form the at least one gap 400. In some embodiments, the side surfaces 12, 14 of the construction slabs 200, 300 may be substantially planar. In some embodiments, the side surfaces 12, 14 may be substantially parallel to each other.

As shown in FIG. 2, the construction slabs 200, 300 may each include or form a respective upper surface 8, 10. In some embodiments, the upper surfaces 8, 10 may be substantially planar. In some embodiments, the side surface 12, 14 and the upper surface 8, 10 of the respective construction slabs 200, 300 may be oriented substantially perpendicular to each other (i.e., the upper surface 8 and the side surface 12 of the construction slab 200 may form an approximately right angle, and/or or the upper surface 10 and the side surface 14 of the construction slab 300 may form an approximately right angle). "Perpendicular", for purposes of this disclosure, does not necessarily mean that the side surfaces 12, 14 are oriented or arranged exactly 90° to the respective upper surfaces 8, 10, nor that the side surfaces 12, 14 and/or the upper surfaces 8, 10 are completely straight for their entire length; rather, "perpendicular" is meant to indicate a relationship between the side surfaces 12, 14 and the respective upper surfaces 8, 10, that is approximately perpendicular as one of ordinary skill in the art would appreciate. In some embodiments, the side surfaces 12, 14 are not straight, and may be curved or angled at one or more points along their length. In some embodiments, the upper surfaces 8, 10 of the construction slabs 200, 300 may be substantially level with each other, forming a plane. In a roadway formation application, for instance, such a level relationship between the upper surfaces 8, 10 of the slabs 200, 300 may allow for the formation of a smooth transition between the slabs 200, 300, resulting in a smoother vehicular ride there-over.

The two adjacent construction slabs 200, 300 may be relatively positioned or arranged such that they form a gap 400 between the side surfaces 12 and 14 thereof, as shown in FIG. 2. The gap 400 may allow for relative movement of the slabs 200, 300, such as due to temperature changes and/or vibrational or other external forces. The width of the gap 400 may vary depending on the particular slabs 200, 300, for instance, whether the slabs 200, 300 are being used for a roadway, a bridge, an overpass, a parking garage, or a building, for example. The width of the gap 400 may be defined by the distance extending directly across the gap 400 between corresponding points of the side surfaces 12, 14 of the slabs 200, 300. In some embodiments, the width of the gap 400 may be within the range of about ½" and 3 inches. In other embodiments, the width of the gap 400 may be within the range of about 1 inch and 4 inches. In still other embodiments, the width of the gap 400 may be within the range of about ¾" and 5". In yet other embodiments, the width of the gap 400 may be within the range of about 1" and 12 inches. In some embodiments, the width of the gap 400 may be within the range of about ½" and 12 inches. In other embodiments, the width of the gap 400 may be within the range of about ½" and six inches. In other embodiments, the width of the gap 400 may be within the range of about ½" and five inches. In some embodiments, the width of the gap 400 may be within the range of about ½" and four inches. In some embodiments, the width of the gap 400 may be within the range of about ¾" and 12 inches. In some embodiments, the width of the gap 400 may be within the range of about ¾" and four inches. In some embodiments, the width of the gap 400 may be within the range of about ¾" and three inches. In some embodiments, the width of the gap 400 may be within the range of about one inch and five inches. In some embodiments, the width of the gap 400 may be within the range of about one inch and three inches.

The present disclosure provides a seal member or joint seal 100 for insertion into, and sealing of, such a gap 400 between slabs 200, 300. As shown by the broken lines 100'/100" in FIG. 2, the sealing member 100 may be deformable between at least two states. The first state 100'/100" can be thought of as the as-delivered, natural or neutral state as it may be the sealing member's 100 non-deformed or as-manufactured state. In some embodiments, the first state 100'/100" of the sealing member 100 may be a linear, planar and/or cuboid form or shape, as shown by the broken lines marked 100' in FIG. 2. In other embodiments, the first state 100'/100" of the sealing member 100 may be arranged in a spiral or rolled form or shape, and potentially able to un-roll into the linear, planar and/or cuboid shape. In still other embodiments, the first state 100'/100" may be pre-formed in a shape similar to the shape found in the second state (such as a "U" shape, as described below), as shown by the broken lines marked 100" in FIG. 2.

The sealing member 100 may be cut and/or plastically deformed to any desired dimensions (e.g., length, width, and/or depth/thickness) and/or shape, such as to configure the sealing member 100 to suit a particular gap 400. In some instances, two or more portions or sections of sealing member 100 (potentially in the first state 100'/100") may be joined together to obtain a desired size and/or shape. In some embodiments, two or more portions of the sealing member 100 may be configured such that they are able to be joined or fixed together by heat welding.

In some embodiments, the sealing member 100 may be formed of or include a substantially flexible or deformable material. The flexible nature of the sealing member 100 may allow the sealing member 100 to be deformed from the first state 100'/100" to a second state that is different from the first state 100'/100". The sealing member 100 may be configured to elastically and/or plastically deform (e.g. bend and/or compress) from the first state 100'/100" to the second state. In some embodiments, the sealing member 100 may be configured to at least partially elastically deform from the first state 100'/100" to the second state such that in the second state, the sealing member 100 includes or is loaded/ pre-loaded with an elastic force acting to deform the sealing member 100 from the second state back to the first state 100'/100".

The sealing member 100 may be inserted into the gap 400 in the second state, as illustrated in FIG. 2 where the first state 100'/100" is represented by the broken lines marked 100'/100" and the second state is represented by solid lines. In some embodiments, even if the shape of the first state 100'/100" of the sealing member 100 appears to be the same or substantially similar as that of the second state, the sealing member 100 may be deformed (i.e., compressed) to some level upon insertion into the gap 400, thereby forming the second state. In some embodiments, the sealing member 100 may include a sufficient amount of elastic deformation (e.g., bending and/or compression) in the second state (acting toward the first state 100'/100", for example) when installed in the gap 400 such that the sealing member 100 is able to maintain engagement with the slabs 200, 300 if the gap 400 widens, to account for differences in temperature and/or movement of the slabs 200, 300, for example.

In some embodiments, the sealing member 100 may be formed of or include closed cell foam. In some embodiments, the sealing member 100 includes polyethylene. In other embodiments, the sealing member 100 includes a copolymer comprising polyethylene. In still other embodiments, the sealing member 100 includes a copolymer of Ethylene Vinyl Acetate (EVA) and polyethylene. A non-limiting representative example is Ply Seal® FB, HALS (Polyset Company, Mechanicville, N.Y.). In some embodiments, the closed cell foam includes an expanded low density polyethylene foam. In yet other embodiments, the sealing member 100 is a pre-formed, low density, closed cell, cross linked polyethylene material. In some embodiments, the sealing member 100 is polyvinylidene fluoride. In some embodiments, the sealing member 100 cell generation is chemically generated. Non-limiting representative examples include Ply-Seal® FB and Ply-Seal® FG (both from Polyset Company, Mechanicville, N.Y.). Chemically generated closed cell foams are acceptable for use in these embodiments, however, the cell structures are not always uniform and a chemical residue may be left after the formation process is completed. In other embodiments, the sealing member 100 includes a nitrogen blown polyethylene material. One non-limiting example is Ply Seal® (Polyset Company, Mechanicville, N.Y.), which is 'physically blown' using nitrogen to form the cell structure of the foam. This process produces a clean, uniform, cell structure. Other closed cell foams, such as Ply-Seal® XE or Ply-Seal® XE Beige (both from Polyset Company, Mechanicville, N.Y.), or EV-50, or Plastazote®, Propozote®, Evazote®, Supazote®, or ZOTEK F (all from Zotefoams, Walton, Ky.) may be used. Additional components, such as light stabilizers for UV resistance, may also be present in the sealing member 100. The flexibility of the sealing member 100 allows it to be used regardless of contours, differing joint gap sizes, or intersections. It may be compatible with slabs 200, 300 including steel, concrete, asphalt, wood, and other construction materials.

Any closed cell foam sealing member 100 that is flexible, waterproof, chemical resistant, compatible with construction materials, UV- and weather-resilient, and resistant to abrasion, oxidation, oils, gasoline, salt and other materials that may come in contact with the surface may be used. In some embodiments, an open cell foam that provides the characteristics above may be used; for instance, an open cell foam material that is infused or saturated with, or which surfaces are covered by, a waterproof substance may be utilized. Non-limiting examples of such substances include acrylic (as in the BEJS System by Emseal Joint Systems Ltd., Westborough, Mass.).

In some embodiments, the density of the sealing member 100 in the first state is within the range of 1.5 lbs/ft$^3$ to 4 lbs/ft$^3$. In other embodiments, the density of the sealing member 100 in the first state is within the range of 1.5 lbs/ft$^3$ to 3.5 lbs/ft$^3$. In still other embodiments, the density of the sealing member 100 in the first state is within the range of 2 lbs/ft$^3$ to 4 lbs/ft$^3$. In yet other embodiments, the density of the sealing member 100 in the first state is within the range of 2 lbs/ft$^3$ to 3.5 lbs/ft$^3$. In further embodiments, the density of the sealing member 100 in the first state is within the range of 2.5 lbs/ft$^3$ to 4 lbs/ft$^3$. In some embodiments, the density of the sealing member 100 in the first state is within the range of 2.5 lbs/ft$^3$ to 3.5 lbs/ft$^3$. In yet other embodiments, the density of the sealing member 100 in the first state is within the range of 2.5 lbs/ft$^3$ to 3 lbs/ft$^3$. In yet other embodiments, the density of the sealing member 100 in the first state is within the range of 2 lbs/ft$^3$ to 3 lbs/ft$^3$.

In some embodiments, the elongation of the sealing member 100 in the first state is within the range of 100 to 1000%. In other embodiments, the elongation of the sealing member 100 in the first state is within the range of 100 to 500%. In still other embodiments, the elongation of the sealing member 100 in the first state is within the range of 100 to 300%. In yet other embodiments, the elongation of the sealing member 100 in the first state is within the range of 100 to 250%. In some embodiments, the elongation of the sealing member 100 in the first state is within the range of 150 to 350%. In further embodiments, the elongation of the sealing member 100 in the first state is within the range of 150 to 300%. In some embodiments, the elongation of the sealing member 100 in the first state is within the range of 200 to 350%. In other embodiments, the elongation of the sealing member 100 in the first state is within the range of 200 to 300%. In some embodiments, the elongation of the sealing member 100 in the first state is within the range of 200 to 250%.

As shown in FIGS. 3-5E, and as discussed further below, at least in the second state the sealing member 100 may form an upside-down "U" or convex shape such that two wall portions 2, 4 of the sealing member 100 are positioned within the gap 400 and between the slabs 200, 300. The wall portions 2, 4 are separate and distinct, and each have an inner surface 3, 5 and an outer surface (not numbered); the outer surfaces of the wall portions 2, 4 are disposed against the side surfaces 12, 14 of the slabs 200, 300. The inner surface 3, 5 substantially opposes the outer surface, and the inner surfaces 3, 5 face each other and are adjacent at least in the second state. It is noted that the sealing member 100 may also form a "U" or convex shape in the first state, and deform therefrom into a differing "U" or convex shape into the second state.

Figure 3:
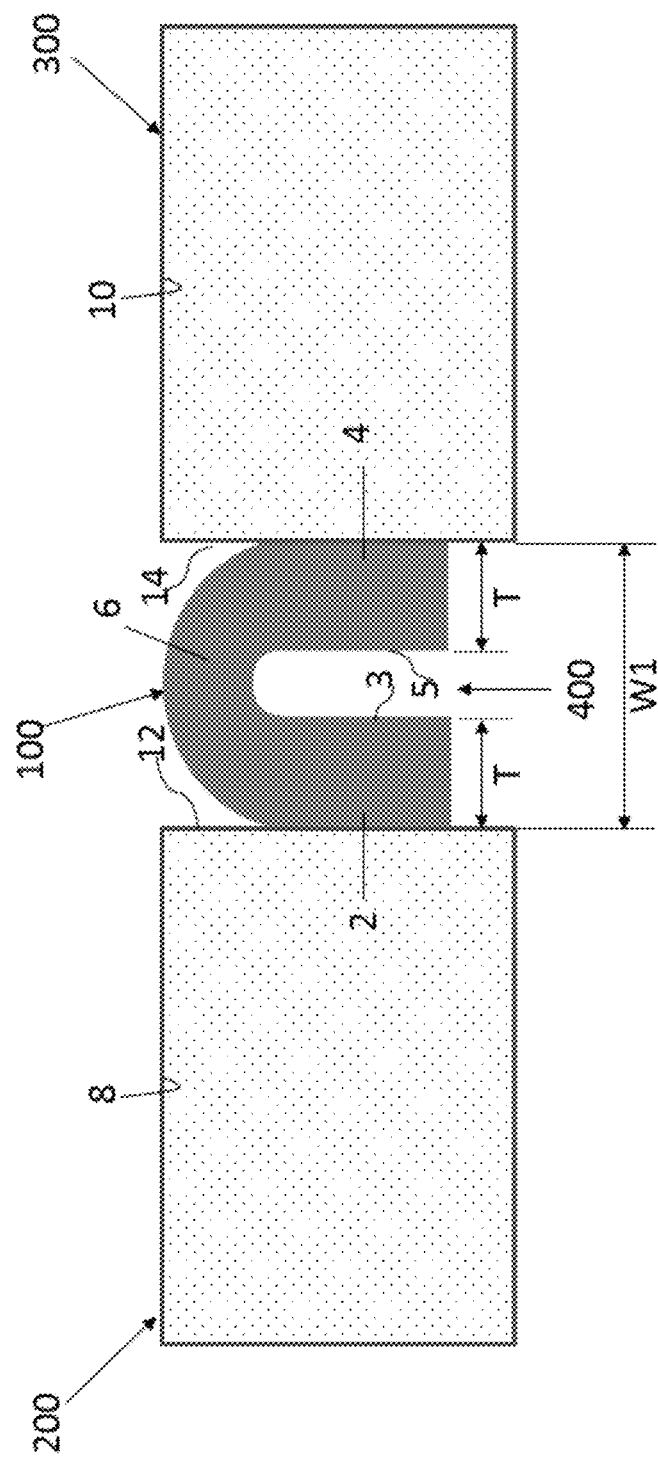
FIG. 3 depicts one embodiment of a joint seal sealing a joint gap between adjacent structural slabs, in accordance with one or more aspects of the present disclosure.

The thickness T of at least the wall portions 2, 4 of the sealing member 100 may be tailored to the width W1 and depth of the gap 400, as shown in FIG. 3. The sealing member 100 as inserted into the gap 400 is compressed against the side surfaces 12, 14 of the slabs 200, 300, as shown in FIG. 3; this compression allows the sealing member 100 to remain in the gap 400, even with various movements of the slabs 200, 300. As shown in FIG. 5E, in some embodiments the thickness T2 of at least the wall portions 2, 4 of the sealing member 100 may be approximately one-half the width W1 of the gap opening 400. For instance, if the width W1 of the gap 400 is two inches, the thickness T2 of at least the wall portions 2, 4 of the sealing member 100 may be approximately one inch. The thickness T of at least the wall portions 2, 4 of the sealing member 100 may be varied, however, as shown in FIG. 5A and FIG. 5E. As shown in FIG. 5A for example, the thickness T1 of at least the wall portions 2, 4 of the sealing member 100 may be less than one-half the width W1 of the gap 400. As another example, the thickness T of at least the wall portions 2, 4 of the sealing member 100 may be greater than the width W1 of the gap 400. In such embodiments, at least the wall portions 2, 4 of the sealing member 100 may be flexible or compressible such that the at least the wall portions 2, 4 of the sealing member 100 are at least partially compressed to fit within the gap 400. It is noted that the flexibility or compressibility of the sealing member 100 may depend, at least partially, on the composition of the sealing member 100. A "softer" material will be able to compress more, so the thickness T may be greater than a sealing member 100 that has less compression for a gap 400 of a particular width W1. In some embodiments, the thickness T of at least the wall portions 2, 4 of the sealing member 100 may be within the range of about one inch and about five inches. In other embodiments, the thickness T of at least the wall portions 2, 4 may be within the range of about one inch and about two inches, about one inch and about three inches, or one about inch and about four inches. In still other embodiments, the thickness T of at least the wall portions 2, 4 of the sealing member 100 may be within the range of about two inches and about three inches, about two inches and about four inches, or about two inches and about five inches. In some embodiments, the thickness T of at least the wall portions 2, 4 of the sealing member 100 is within the range of about 1.5 inches and about 3.5 inches. In other embodiments, the thickness T of at least the wall portions 2, 4 of the sealing member 100 is within the range of about 0.5 inches and about five inches. In still other embodiments, the thickness T of at least the wall portions 2, 4 of the sealing member 100 is within the range of about 0.5 inches and about four inches. In yet other embodiments, the thickness T of at least the wall portions 2, 4 of the sealing member 100 is within the range of about 0.5 inches and about three inches. In some embodiments, the thickness T of at least the wall portions 2, 4 of the sealing member 100 is within the range of about 0.5 inches and about two inches. In some embodiments, the thickness T of at least the wall portions 2, 4 of the sealing member 100 is within the range of about 0.5 inches and about one inch. In other embodiments, the thickness T of at least the wall portions 2, 4 of the sealing member 100 is within the range of about 0.5 inches and about 1.5 inches.

Figure 5:
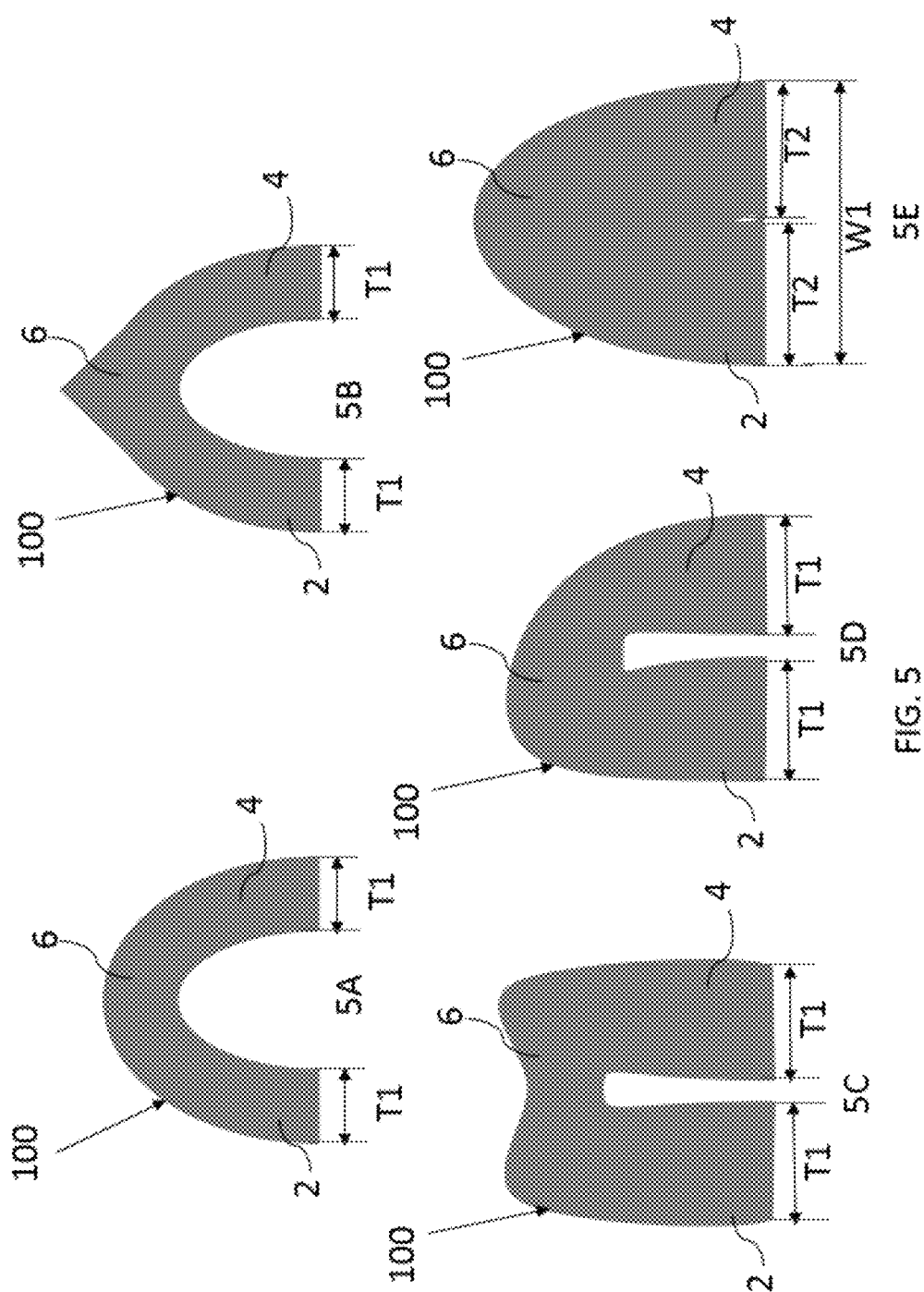
FIG. 5 depicts various embodiments of joint seals in accordance with one or more aspects of the present disclosure.

In at least the second state, the sealing member 100 may or may not form a perfect upside-down "U-shape" upon bending/compression and insertion into the gap 400 between two adjacent slabs 200, 300. For instance, the sealing member 100 may resemble more of a "V" or a "W" if it is creased, or it could be off-center. However, it is desirable to have the sealing member as close to a "U" shape as possible, as any additional creases could cause debris to collect in the seal, could result in decreased strength or stability of the sealing member, or could cause a trip hazard if a spike heal is caught in the crease. Various embodiments of at least the second state of the sealing member 100 are illustrated in FIG. 5. FIG. 5A shows a U-shaped embodiment of the sealing member 100 in the second state. FIGS. 5B, 5C, and 5D illustrate various embodiments that may result when forming the sealing member 100 from the first state to the second state. FIG. 5E shows an embodiment similar to FIG. 5A, except the thickness T2 of the sealing member 100 of FIG. 5E is greater in relation to the width W1 of the gap 400 than that of FIG. 5A, and/or the compression of at least the wall portions 2, 4 of the sealing member 100 is greater, resulting in a more filled-in gap under the convex portion of the sealing member.

FIG. 3 illustrates the sealing member 100 in the second state as inserted into an exemplary gap 400 between at least two adjacent slabs 200, 300. As shown in FIG. 2 and FIG. 3, the second state of the sealing member 100 includes or forms two wall portions 2 and 4 and a convex portion 6 extending therebetween. The sealing member 100, in the second state, may be within the gap 400 such that the peak of the outer surface of the convex portion 6 of the sealing member 100 is level with or below the upper surfaces 8, 10 of the construction slabs 200, 300. "Peak", as defined herein, means the "tallest" or "highest" portion of the outer surface of the convex portion 6 of the sealing member 100, that is, the portion of the outer surface of the convex portion 6 closest to the plane of the upper surfaces 8, 10. In some embodiments, the entirety of the convex portion 6 is level with or below the upper surfaces 8, 10 of the construction slabs 200, 300. In some embodiments, the peak of the outer surface of the convex portion 6 of the sealing member 100 may be within the range of about ⅛" and about ¾" below the upper surfaces 8, 10. In other embodiments, the peak of the outer surface of the convex portion 6 may be within the range of about ⅛" and about ⅝" below the upper surfaces 8, 10. In still other embodiments, the peak of the outer surface of the convex portion 6 may be within the range of about ⅛" and about ½" below the upper surfaces 8, 10. In yet other embodiments, the peak of the outer surface of the convex portion 6 may be within the range of about ⅛" and about ⅜" below the upper surfaces 8, 10. In some embodiments, the peak of the outer surface of the convex portion 6 of the sealing member 100 may be within the range of 0" and about ¾" below the upper surfaces 8, 10. In other embodiments, the peak of the outer surface of the convex portion 6 of the sealing member 100 may be within the range of 0" and about ⅝" below the upper surfaces 8, 10. In some embodiments, the peak of the outer surface of the convex portion 6 of the sealing member 100 may be within the range of 0" and about ⅜" below the upper surfaces 8, 10.

The wall portions 2, 4 may be disposed against the adjacent side surfaces 12, 14 of the construction slabs 200, 300. Because the sealing member 100 is deformed or compressed from the first state into the second state when inserted into the gap 400, the sealing member 100 may exert an outward force on each of the wall portions 2, 4 (i.e., toward the corresponding side surfaces 12, 14 of the slabs 200, 300). The compressive strength of the sealing member 100, along with the outward force (i.e., spring action), of the sealing member 100 is sufficient to act as a stay-in-place form. The presence of this force may eliminate the need for a temporary pre-form to be inserted and removed, as described above, resulting in time and cost savings, as well as a cleaner, stronger joint seal.

The surface area of the outer surface of each of the wall portions 2, 4 that contact, and potentially exert a force against, the corresponding side surfaces 12, 14 of the slabs 200, 300) may depend, at least partially, upon a number of factors. One consideration in the amount of contact area of the wall portions 2, 4 and the corresponding side surfaces 12, 14 of the slabs 200, 300 may be the length of the side surfaces 12, 14 of the slabs 200, 300. Another factor may be the required rigidity of the sealed joint. If a very rigid joint is desired, it may be advantageous to have longer wall portions 2, 4 (extending in the depth direction, in the second state) in contact with the corresponding side surfaces 12, 14 of the slabs 200, 300, perhaps even lengths that cover the entire length (extending in the depth direction) of the side surfaces 12, 14 of the slabs 200, 300. The lengths of the wall portions 2, 4 do not have to be equal, but they may be. In some embodiments, the length of each wall portion 2, 4 of the sealing member 100 may be within the range of about two inches and about twelve inches. In other embodiments, the length of each wall portion 2, 4 of the sealing member 100 may be within the range of about two inches and about 24 inches. In other embodiments, the length of each wall portion 2, 4 of the sealing member 100 may be within the range of about two inches and about 12 inches. In still other embodiments, the length of each wall portion 2, 4 of the sealing member 100 may be within the range of about two inches and about nine inches. In yet other embodiments, the length of each wall portion 2, 4 of the sealing member 100 may be within the range of about two inches and about six inches. In still other embodiments, the length of each wall portion 2, 4 of the sealing member 100 may be within the range of about two inches and about six inches. In other embodiments, the length of each wall portion 2, 4 of the sealing member 100 may be within the range of about six inches and about 24 inches. In still other embodiments, the length of each wall portion 2, 4 of the sealing member 100 may be within the range of about six inches and about 12 inches. In yet other embodiments, the length of each wall portion 2, 4 of the sealing member 100 may be within the range of about six inches and about nine inches.

Figure 4:
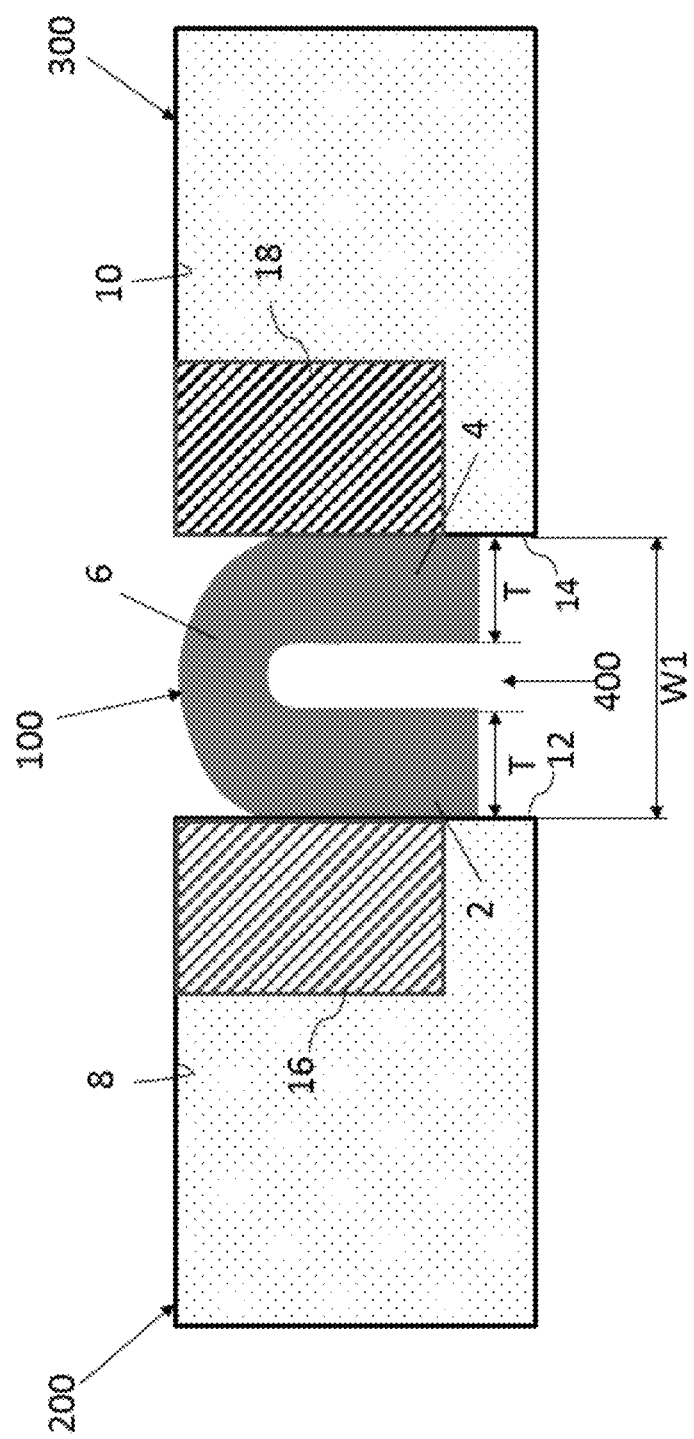
FIG. 4 depicts one embodiment of a joint seal sealing a joint gap between adjacent structural slabs with nosings, in accordance with one or more aspects of the present disclosure.

In some embodiments, at least one of the construction slabs 200, 300 may include a nosing, or header. FIG. 4 shows an embodiment of construction slabs 200, 300 with corresponding nosings or headers 16, 18. The nosing 16, 18 may form a portion of the upper surface 8, 10 and a portion of the side surface 12, 14 of the construction slab 200, 300). In some embodiments, the nosing 16, 18 of the construction slabs 200, 300 may be positioned at the junction of the upper surface 8, 10 and the side surface 12, 14 of the corresponding construction slab 200, 300.

Installation of the nosings 16, 18 may include cutting "block-outs" of the desired size of the nosing 16, 18 from the slab(s) 200, 300 and cleaning and preparing the cut surfaces to receive the nosing material. Nosings 16, 18 may be formed by or include a resin, may contain aggregate, and may be more flexible than the surrounding concrete substrate, resulting in better impact absorption. Non-limiting examples of nosing 16, 18 materials include elastomeric concrete; steel; asphalt; polymer concrete; wood; or a cementitious mix/mortar including, but not limited to, cement, aggregates, and a liquid activator. In some embodiments, the nosings 16, 18 are polyurethane-based. In some embodiments, the nosings 16, 18 contain elastomeric concrete. In some embodiments, the nosings 16, 18 contain aggregate. In some embodiments in which a nosing 16, 18 is present, the wall portions 2, 4 of the sealing member 100 may only contact, and potentially exert a force against, the nosings 16, 18. In other embodiments, the wall portions 2, 4 of the sealing member 100 may contact, and potentially exert a force against, the nosings 16, 18 and a relatively small surface area of the side walls 12, 14 of the slabs 200, 300. In still other embodiments, the wall portions 2, 4 of the sealing member 100 may contact, and potentially exert a force against, the nosings 16, 18 and a relatively large surface area of the side walls 12, 14 of the slabs 200, 300.

Prior art methods typically include the insertion of a temporary preform (for instance, Styrofoam) into the joint gap 400. Once the preform is inserted and the surfaces are prepared, the nosing material 16, 18 may be added. The presence of the temporary preform prevents the nosing material from running out and down the side walls of the slabs. When the nosing material 16, 18 has cured, the temporary preform must be removed, generally by sawing the material loose and removing it; however, this method is time consuming and often leaves pieces and residue of the preform within the joint 400. The methods disclosed herein, however, allow for the omission of the temporary preform. Briefly, once the cuts for the nosing 16, 18 have been made in the slabs 200, 300 (i.e., the block-outs have been formed) and the cut surfaces properly cleaned, the sealing member 100 may be inserted into the joint gap 400 as described herein, and the nosing material 16, 18 may be added. No preform is necessary, as the wall portions 2, 4 of the sealing member 100 may act to prevent the nosing material 16, 18 from running down the side walls 12, 14 of the slabs 200, 300. The exclusion of the preform saves time, labor and material costs and results in a cleaner joint gap 400. The structure is returned to service much more quickly without this step.

Other existing joint seal systems may utilize a nosing without a temporary form. However, these systems are "wing" systems. Once the block-out is formed, a rubber sealing gland with flanges is placed on the horizontal surface of the block-out (i.e., the bottom of the block-out), and the nosing material is placed on top of the "wing" of the rubber sealing gland. The nosing material holds the rubber sealing gland in place. Two such systems are EMSEAL Thermaflex (EMSEAL JOINT SYSTEMS LTD., 25 Bridle Lane, Westborough, Mass. 01581) and Wabo Crete Membrane (Watson Bowman Acme Corp. 95 Pineview Drive, Amherst, N.Y. 14228). These systems are quite different from those described herein. Further, they are not desirable for bridge decks or other similar structures, as the rubber-like wing compresses under heavy loads, resulting in cracking in the nosing material above the wing. In some instances, it is very difficult to bond anything to the vertical sides of gland in the wing systems due to the nature of the material; this is the reason the wings are added to the gland. The sealing member 100 described herein receives adhesive bonding material very well, and the addition of grooves can enhance the adhesive nature. Further, the wing system requires a size-specific seal based on joint openings. (This is confirmed by the seal size chart supplied by the manufacturers.) In contrast, the sealing member 100 disclosed herein can fit a wide variety of joint gap sizes. As a non-limiting example, a sealing member 100 with a thickness T of ½" can easily be used in a gap 400 with a width W1 from 1" to 2", while a sealing member 100 with a thickness T of 1" can fit a joint gap 400 with a width W1 from 2" to 5" wide. These two sealing member thicknesses can cover a full range of gaps with widths from 1" to 5", whereas the wing systems described above would require multiple seal sizes and precise premeasurements prior to seal selection. To be perfectly clear, sealing members 100 of other thicknesses T may also be used, as disclosed above.

In some embodiments, adhesive may be applied to the sealing member 100 and/or to the side surface(s) 12, 14 to aid in preventing movement of the sealing member 100 within the gap 400. Adhesive application methods are well known in the art and will not be discussed in detail here. In some embodiments, adhesive may be applied to at least a portion of the outer surface of at least one of the wall portions 2, 4. In other embodiments, adhesive may be applied to at least a portion of the outer surfaces of both wall portions 2, 4. In still other embodiments, adhesive may be applied to at least a portion of the side surface 12, 14 of at least one of the construction slabs 200, 300. In yet other embodiments, adhesive may applied to at least a portion of the side surfaces 12, 14 of both construction slabs 200, 300. In further embodiments, adhesive may be applied to at least a portion of at least one of the outer surfaces of the wall portions 2, 4 and/or at least one of the side surfaces 12, 14 of the construction slabs 200, 300. For instance, adhesive may be applied to at least a portion of one outer surface of a wall portion 2, 4 of the sealing member 100 and at least a portion of the side surface 12, 14 of the corresponding construction slab 200, 300. Alternatively, adhesive may be applied to at least a portion of the outer surfaces of both wall portions 2, 4 of the sealing member 100 and at least a portion of the side surfaces 12, 14 of both construction slabs 200, 300. In some embodiments, grooves or other recesses may be cut into the outer surface of the wall portions 2, 4 of the sealing member 100 in order to allow for additional adhesive to be applied thereon.

The adhesive may be applied on the entire surface area of the wall portions 2, 4 of the sealing member 100 that contact the side surfaces 12, 14 of the construction slabs 200, 300, but does not necessarily have to be. In some embodiments, the adhesive may be applied for the entire surface area of the wall portions 2, 4 of the sealing member 100 that contact the side surfaces 12, 14 of the construction slabs 200, 300. In some embodiments, the adhesive may be applied along a length of the wall portions 2, 4 of the sealing member 100 in the depth direction (i.e., in relation to the side surface 12, 14) within the range of about ¾ of an inch and about 12 inches. In other embodiments, the adhesive may be applied along a length of the wall portions 2, 4 of the sealing member 100 within the range of about 2 inches and about 12 inches. In still other embodiments, the adhesive may be applied along a length of the wall portions 2, 4 of the sealing member 100 within the range of about 2 inches and about 6 inches. In yet other embodiments, the adhesive may be applied along a length of the wall portions 2, 4 of the sealing member 100 within the range of about 2 inches and about 3 inches. When a nosing 16, 18 made of a material that may act as an adhesive is present, the sealing member 100 may not include adhesive. For instance, concrete, elastomeric concrete, polymer concrete, cementitious mortar, or epoxy may be used as nosing material in this manner. In some embodiments when a nosing 16, 18 of elastomeric concrete is present, the side surfaces 12, 14 of the slab 200, 300 below the nosing 16, 18 (and/or the corresponding portion of the wall portions 2, 4 of the sealing member 100) may include adhesive for additional binding capability.

Any adhesive may be used that allows the seal member 100 to bind to the side surfaces 12, 14 of the slab 200, 300. The composition of the adhesive, if used, may depend on the material used for the construction slabs 200, 300 and/or the sealing member 100 (e.g., a closed cell foam). Non-limiting examples include two-part epoxies (such as Ply-Bonder® or Ply-Primer® (both from Polyset Company, Mechanicville, N.Y.), one- or two-part polyurethanes, silicones, or other polymer materials. In some embodiments, the adhesive is a two-part epoxy.

In some embodiments, a sealant may be applied over the outer surface of the convex portion 6 of the sealing member 100. In some embodiments, a sealant may be applied over the outer surface of the convex portion 6 of the sealing member 100 and at least a portion of the upper surfaces 8, 10 of the slabs 200, 300 and/or the upper surfaces of the nosings 16, 18, if present. In such embodiments, at least the upper portion of the joint gap 400 may be completely filled in and covered by the sealant and the sealing member 100.

In general, appropriate sealants may be those that are liquid when applied but solidify to be strong enough to accommodate forces during use (such as vehicular traffic), have high flexibility, and provide smooth, waterproof coverage over the joint gap 400. Suitable sealants include those that are flexible, fast curing, self-leveling to mastic, and UV and weather resilient. A suitable elongation rate for the sealant is between 100 and 1000%, or between 500 and 1000%, or between 400 and 800%, or between 500 and 750%. In some embodiments, the sealant is selected from two-part flexible urethane, one- or two-part polyurethane, silicone, or other polymer materials. In some embodiments, the sealant is a two-part flexible urethane sealant. Non-limiting examples of sealants include, but are not limited to, Ply-Sealant 30, Ply-Sealant 50, Ply-Sealant 75, Liquid Ply-Krete®, Ply-Bonder, Ply-Bonder CC, or Ply-Bonder FC (all from Polyset Company, Mechanicville, N.Y.).

In some embodiments, the joint seal 100 may be utilized in a new construction application. When a new roadway is being formed, for instance, the site may be prepared, and forms for the slabs 200, 300 (e.g., concrete pours) may be put in place. The slabs 200, 300 may then be formed (e.g., poured with concrete), finished and allowed to cure to form the gap 400. The sealing member 100 may be installed in the gap 400 as described herein.

The present invention provides, in another aspect, an assembly of a sealing member 100 and slabs 200, 300. Examples of such assemblies are illustrated in FIGS. 3 and 4, which are described above. The assemblies include at least two construction slabs 200, 300, forming a gap 400 below upper surfaces and between adjacent side surfaces 12, 14 thereof. The assemblies also include a sealing member 100 installed within the gap 400 and substantially sealing the gap 400. In some embodiments, the sealing member 100 may include or be formed of closed cell foam. In some embodiments, the closed cell foam is an expanded low density polyethylene foam. In other embodiments, the closed cell foam is nitrogen blown polyethylene. In some embodiments, the sealing member 100 may be deformable between a first state (shown in FIG. 2 as 100' or 100", for example) and a second state 100 installed within the gap 400. At least in the second state, the sealing member 100 includes or forms two wall portions 2, 4 and a convex portion 6 extending between the wall portions 2, 4. The sealing member 100 may be installed within the gap 400 such that a peak or "highest" portion of the outer surface of the convex portion 6 of the sealing member 100 is positioned level with or below the upper surfaces 8, 10 of the construction slabs 200, 300. The sealing member 100 may be in the second state installed within the gap 400 with the wall portions 2, 4 disposed and exerting a force against the adjacent side surfaces 12, 14 of the construction slabs 200, 300.

As noted above, the width of the gap 400 and the lengths of the wall portions 2, 4 may vary. As also described above, the sealing member 100 of the assemblies may include an adhesive between the outer surface of at least one of the two wall portions 2, 4 of the sealing member 100 and the side surface 12, 14 of the corresponding construction slabs 200, 300. In some embodiments, the slabs 200, 300 of the assemblies may include nosings 16, 18, as illustrated in FIG. 4 and described above.

In some embodiments, the assemblies may include a sealant applied over the outer surface of the convex portion 6 of the sealing member 100, as described above. The sealant also may optionally be applied over at least a portion of the upper surfaces 8, 10 of the slabs 200, 300 and/or the upper surfaces of the nosings 16, 18, if present, as described above.

In another aspect, the present disclosure provides the sealing member or joint seal 100. As described above, the joint seal may be utilized to substantially seal a gap 400 between adjacent side surfaces 12, 14 of construction slabs 200, 300.

As described above, the sealing member or joint seal 100 may be at least partially plastically deformed from the first state to the second state and/or compressed when in a joint gap 400 to substantially seal the gap 400 and allow for shifting of the construction slabs 200, 300 due to, for instance, traffic vibrations or weather changes. In some embodiments, the sealing member or joint seal 100 may be made from or include a flexible foam to provide such an elastic or flexible nature. In some embodiments, at least partially elastically deforming the sealing member 100 from the first state to the second state results in the wall portions 2, 4 of the sealing member 100 in the second state exerting a force against the side surfaces 12, 14 of the construction slabs 200, 300. This force allows the wall portions 2, 4 of the sealing member 100 to flex or adapt and remain in place against the side surfaces 12, 14 of the construction slabs 200, 300 when shifting of the side surfaces 12, 14 occurs.

GENERAL EXAMPLE

A gap between adjacent construction slabs as described above may be sealed by the sealing member or joint seal disclosed herein. For example, portions of side surfaces of the adjacent construction slabs forming the gap that may be in contact with the sealing member may be prepared by, for instance, sandblasting with oil free compressed air. Compressed air may be used to remove dust and/or debris after blasting. Any acceptable method may be used to prepare the surfaces to the desired profile and/or cleanliness. Steel substrates could be prepared to a white finish with a good surface profile (SSPC-10). Steel, concrete, and elastomeric concrete (for instance, but not limited to, PlyKrete® brands) may not be primed prior to installation of the sealing member; however, steel with coatings or additives may be primed. Metalized steel may be lightly brush-blasted to insure all foreign debris is removed.

If desired, duct tape may be applied to the top surfaces of the slabs about ¼-½" away from the joint gap to reduce clean up.

The sealing member may be cut and/or connected in order to obtain the desired size. The sections may be connected together by heat-welding; additional welds may be performed in the field. All intersections and connections may be performed prior to mixing the adhesive, if a mixed adhesive is used.

The adhesive may be mixed and coated on the side surfaces of the slabs and/or the outer surfaces of the sealing member. The sealing member can be compressed and/or deformed and installed into the joint. A tool or gloved hands may be used for this installation. The subsequent expansion or deformation of the sealing member (i.e., from compression and/or deformation) into the second state can cause an outward force to be applied against the side surfaces of the slabs, aiding the adhesion of the sealing member to the slabs. The sealing member can be installed such that the outer surface of the convex portion is approximately ⅛-½" below a plane formed by the upper surfaces of the slabs. Any excess adhesive may be removed from the outer surface of the convex portion of the sealing member. An average installation time using such a sealing member or joint seal may be about 1-2 ft./minute for sealing members extending about 2-3" deep into the gap.

SPECIFIC EXAMPLES

Example 1

A typical installation in which the sealing member 100 was installed into an existing joint gap 400 between two concrete slabs 200, 300, such as those shown in FIGS. 2 and 3, is described herein.

The width W1 of the gap 400 to be sealed between the slabs 200, 300 was measured. A sealing member 100 was chosen that had a thickness a maximum of ½ the gap width W1. The length of the sealing member was equal to the length of the gap to be sealed which, in this case, was the entire width of the bridge structure.

The adjacent side surfaces 12, 14 of construction slabs 200, 300 were sandblasted. This preparation provides a good surface profile to receive the adhesive. Duct tape was applied to the upper surfaces 8, 10 of the slabs 200, 300, approximately ¼-½" away from the joint gap 400. This optional step reduces clean up.

The adhesive (Ply-Bonder or equal) was mixed per the directions and placed on the adjacent side surfaces 12, 14 of construction slabs 200, 300 at the recommended coverage rate. The sealing member 100 was laid out on the construction slab next to the gap 400 along the length of the gap, and the adhesive was applied to the surface area of the wall portions 2, 4 of the sealing member 100 that contact the side surfaces 12, 14 of the construction slabs 200, 300. In this example, grooves were present in the outer surface of the wall portions 2, 4 of the sealing member 100 to allow for additional adhesive to be applied. Adhesive was not applied to the convex portion 6 of the sealing member 100.

The sealing member 100 was then deformed (by a user with gloved hands) to 'fold' the sealing member 100 in half to form an upside down "U." The sealing member 100 was oriented such that the adhesive was on the outer surfaces of the wall portions 2, 4 of the sealing member 100, and positioned such that these outer surfaces would contact the side surfaces 12, 14 of the construction slabs 200, 300 upon insertion. The sealing member 100 was placed into the gap 400 with the wall portions 2, 4 of the sealing member 100 being inserted first, parallel to the side surfaces 12, 14 of the construction slabs 200, 300. The uncoated convex portion 6 of the sealing member 100 was inserted flush with (alternatively, slightly below) the upper surfaces 8, 10 of the slabs 200, 300.

Excess epoxy was removed from the exposed top of the seal after it was installed to allow the sealing member 100 to move freely in the gap. Excess adhesive was cleaned from the upper surfaces 8, 10 of the slabs 200, 300, and the temporary duct tape was removed. The adhesive was allowed to set prior to traffic return.

Example 2

A typical installation in which the sealing member 100 was installed into an joint gap 400 between two concrete slabs 200, 300, in which nosings are also being installed, such as that shown in FIG. 4, is described herein.

The surfaces of the concrete slabs and the block outs (i.e., where the nosing material is applied) were sandblasted to receive the nosing material 16, 18 per plans and recommendations. Loose debris was removed with oil free, dry compressed air. This preparation normally provides a good surface profile to receive the liquid applied nosing material. This surface preparation of the side surfaces 12, 14 of the construction slabs 200, 300 was completed to a minimal depth of 3". Duct tape was applied to the upper surfaces 8, 10 of the slabs 200, 300, approximately ¼-½" away from the joint gap 400. This optional step reduces clean up.

Ply-Primer (Polyset Company, Mechanicville, N.Y.) was mixed per specifications. The primer was applied to all surfaces of the concrete slabs 200, 300 that received the nosing material (i.e., walls and base of "block-out", where nosing material 16, 18 is applied). Primer also was applied 3" below the base of the block out on the side surfaces 12, 14 of the construction slabs.

The width W1 of the gap 400 to be sealed between the slabs 200, 300 was measured and was found to be three inches. A sealing member 100 was chosen that had a thickness of one inch. The length of the sealing member was equal to the length of the gap to be sealed which, in this case, was the entire width of the bridge structure The sealing member 100, Ply-Seal or equal, was laid out on the construction slab next to the gap 400 along the length of the gap. In this example, grooves were present in the outer surface of the wall portions 2, 4 of the sealing member 100 to allow for more surface area contact with the nosing material 16, 18. The seal 100 was laid out next to the joint along the length of the gap with the grooves on the seal up.

The sealing member 100 was then deformed (by a user with gloved hands) to 'fold' the sealing member 100 in half to form an upside down "U" with the grooves on the outside of the legs of the "U" (that is, facing the side surfaces 12, 14 of the construction slabs 200, 300). The deformed sealing member 100 was placed into the gap 400 with the wall portions 2, 4 of the sealing member 100 being inserted first, parallel to the side surfaces 12, 14 of the construction slabs 200, 300. The convex portion 6 of the sealing member 100 was inserted slightly below (that is, approximately ½") the upper surfaces 8, 10 of the slabs 200, 300. The wall portions 2, 4 of the sealing member 100 extended approximately two inches below the base of the block out and were positioned firmly against the side surfaces 12, 14 of the construction slabs 200, 300.

The nosing material (Ply-Krete® FS or equal) 16, 18 was mixed per the manufacture's recommendations. The nosing material 16, 18 was placed in the prepared block-out areas of the construction slabs 200, 300 so that the block-outs were filled. The upper surface of the nosing material was trowel-flushed (i.e., in line with the upper surfaces 8, 10 of the construction slabs 200, 300), and the nosing material was formed in a line with the side surfaces 12, 14 of the construction slabs 200, 300 such that it remains substantially vertical adjacent the convex portion 6 of the sealing member 100.

A sealant, Ply-Sealant or equal, was applied over the top of the sealing member 100, approximately ¼" below the deck surface. This type of sealant used will depend on specifications and recommendations for the intended use.

Excess adhesive was cleaned from the upper surfaces 8, 10 of the slabs 200, 300, and the temporary duct tape was removed. The adhesive was allowed to set prior to traffic return.

Example 3

Example 3 was performed as was Example 2, only no sealant was applied over the top of the sealing member 100.

Example 4

Example 4 was performed as was Example 1, only sealant was applied over the top of the sealing member 100.

Example 5

Example 5 was performed as was Example 1, only the sealing member 100 was pre-formed into the desired U shape. This pre-formed sealing member was compressed in order to fit into the gap 400.

Example 6

Example 6 was performed as was Example 3, only the sealing member 100 was pre-formed into the desired U shape. This pre-formed sealing member was compressed in order to fit into the gap 400.

Figure reference numbers retain their definitions and descriptions throughout this disclosure unless otherwise noted.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), "contain" (and any form contain, such as "contains" and "containing"), and any other grammatical variant thereof, are open-ended linking verbs. As a result, a method that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed. As used herein, the terms "comprising," "has," "including," "containing," and other grammatical variants thereof encompass the terms "consisting of and" "consisting essentially of." The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

All publications cited in this specification are herein incorporated by reference as if each individual publication were specifically and individually indicated to be incorporated by reference herein as though fully set forth.

Subject matter incorporated by reference is not considered to be an alternative to any claim limitations, unless otherwise explicitly indicated.

Where one or more ranges are referred to throughout this specification, each range is intended to be a shorthand format for presenting information, where the range is understood to encompass each discrete point within the range as if the same were fully set forth herein. A given range includes every point between and including one inch and two inches, and includes every "sub-range" of points contained within the range. For example, a range of "one inch to two inches" includes, but is not limited to, one inch to two inches, one inch to 1.35 inches, 0.60 inches to two inches, 1.62 inches to 1.81 inches, etc.

All ranges, parameters, and characteristics described herein are relevant to compositions, products, and processes unless otherwise noted, even if those ranges, parameters, and characteristics were described herein only in the context of a composition, product, or process.

While several aspects and embodiments of the present invention have been described and depicted herein, alternative aspects and embodiments may be affected by those skilled in the art to accomplish the same objectives. Accordingly, this disclosure and the appended claims are intended to cover all such further and alternative aspects and embodiments as fall within the true spirit and scope of the invention.

The invention claimed is:

1. A method for sealing a gap formed below upper surfaces and between adjacent side surfaces of at least two construction slabs, comprising:
   deforming a sealing member comprising closed cell foam from a first state to a second state, the sealing member comprising two wall portions and a convex portion extending directly therebetween in the second state; and
   inserting the sealing member in the second state into said gap such that the two wall portions are disposed against the adjacent side surfaces of the at least two construction slabs, and a peak of the convex portion of the sealing member is substantially level the upper surfaces of the at least two construction slabs; then
   introducing a nosing material into a blocked-out area of at least one of the construction slabs to form a nosing, wherein said nosing forms a portion of the upper surface and the side surface of said at least one construction slab and is positioned at the junction of the upper surface and the side surface of said at least one construction slab.

2. The method according to claim 1, further comprising applying adhesive to either or both of: a) an outer surface of at least one of the two wall portions of the sealing member orb) at least one side surface of at least one of the construction slabs.

3. The method according to claim 2, wherein said adhesive is applied to an outer surface of at least one of the two wall portions of the sealing member.

4. The method according to claim 1, wherein said construction slabs comprise concrete.

5. The method according to claim 1, wherein said closed cell foam is an expanded low density polyethylene foam.

6. The method according to claim 5, wherein said closed cell foam is nitrogen blown polyethylene.

7. An assembly, comprising:
   a) at least two construction slabs forming a gap below upper surfaces and between adjacent side surfaces of at least two construction slabs; and
   b) a sealing member comprising closed cell foam, the sealing member being in a deformed state and including two wall portions and a convex portion extending directly therebetween; and
   c) at least one nosing, comprising a nosing material located in a blocked-out area of at least one of the construction slabs, wherein said nosing forms a portion of the upper surface and the side surface of said at least one construction slab and is positioned at the junction of the upper surface and the side surface of said at least one construction slab,
   wherein a peak of the convex portion of the sealing member is substantially level the upper surfaces of the at least two construction slabs and the two wall portions of the sealing member are disposed and exert a force against the adjacent side surfaces of the at least two construction slabs and said at least one nosing.

8. The assembly according to claim 7, wherein said gap has a width between ½ inch and six inches.

9. The assembly according to claim 7, wherein the outer surfaces of said wall portions have a length extending along depth of the gap between six inches and 24 inches.

10. The assembly according to claim 7, wherein said closed cell foam is nitrogen blown polyethylene.

11. The assembly according to claim 7, further comprising adhesive between the outer surface of at least one of the two wall portions of the sealing member and the side surface of its corresponding construction slab.

12. The assembly according to claim 7, further comprising a sealant on the outer surface of the convex portion of the sealing member and optionally on at least a portion of at least one upper surface of the slabs.

13. A joint seal configured to seal a gap extending below upper surfaces and between adjacent side surfaces of at least two construction slabs, wherein at least one of the construction slabs comprises a nosing, said seal comprising:
   a sealing member deformable between a first state and a second state configured to seal the gap, the sealing member comprising two wall portions and a convex portion extending directly therebetween in the second state, wherein a peak of the convex portion of the sealing member is substantially level the upper surfaces of the at least two construction slabs and the wall portions being disposed and exerting a force against the adjacent side surfaces of the at least two construction slabs in the second state and against the at least one nosing,
   wherein said seal sealing member comprises closed cell foam, and
   wherein said nosing comprises a nosing material located in a blocked-out area of at least one of the construction slabs, wherein said nosing forms a portion of the upper surface and the side surface of said at least one construction slab and is positioned at the junction of the upper surface and the side surface of said at least one construction slab.

14. A joint seal according to claim 13, wherein said second state of said sealing member is a U shape.

15. A joint seal according to claim 13, wherein said wall portions have a length extending along depth of the gap between six inches and 24 inches.

16. A joint seal according to claim 13, further comprising either or both of:
   a) an adhesive between the outer surface of at least one of the two wall portions of the sealing member and the side surface of its corresponding construction slab; and
   b) a sealant on the outer surface of the convex portion of the sealing member and optionally on at least a portion of at least one upper surface of the slabs.

17. The method according to claim 1, wherein said second state of said sealing member is a U shape.

18. The method according to claim 1, wherein a sealant is applied over the outer surface of the convex portion of the sealing member, and is optionally applied over at least a portion of the upper surfaces of the construction slabs and/or the upper surface of the at least one nosing.

19. The method according to claim 1, wherein a nosing is formed in each of the at least two construction slabs.

20. The method according to claim 1, wherein at least one wall portion of the sealing member is further disposed and exerts a force against at least one nosing.

21. The assembly according to claim 7, wherein at least one wall portion of the sealing member is further disposed and exerts a force against the at least one nosing.

22. A joint seal according to claim 13, wherein a nosing is formed in each of the at least two construction slabs.

* * * * *